March 12, 1968 W. E. CLARKE 3,373,367

AMPLIFIER FAILURE INDICATOR

Filed March 1, 1965

INVENTOR
Wallace E. Clarke
BY Harold A. Weir
PATENT AGENT 3,373,367
AMPLIFIER FAILURE INDICATOR
Wallace E. Clarke, Belleville, Ontario, Canada, assignor to Northern Electric Company Limited, Montreal, Quebec, Canada
Filed Mar. 1, 1965, Ser. No. 436,081
8 Claims. (Cl. 330—2)

This invention relates to apparatus for use with a system of amplifiers operating in parallel into a common load, and in particular it relates to apparatus for indicating when a failure occurs in one of two parallel-connected amplifiers and for identifying the amplifier which has failed.

An arrangement for operating two amplifiers connected in parallel to feed a common load is known. In this arrangement two amplifiers have their input terminals connected in parallel to a common signal source and one output terminal of each amplifier connected to opposite ends of a center-tapped coil. A common load is connected between the center-tap of the coil and a common connection to the remaining output terminals of each amplifier. A further resistor having a nominal resistance value four times that of the load is connected between the coil-connected output terminal of one amplifier and the corresponding output terminal of the other, i.e. it is connected in parallel with the center-tapped coil. This known arrangement has the advantage that if one of the amplifiers fails and, as a consequence, its output terminals become either open circuited or short circuited then the remaining active amplifier still operates into a load impedance having the same value as in normal operation.

It is also known to connect an AC relay across the coil to act as an indicator. Should one amplifier fail then the voltages at the coil-connected output terminals of the two amplifiers will cease to be approximately equal and the current will flow in the relay coil. This current actuates the relay to indicate that one of the amplifiers has failed. The operation of the relay does not, however, indicate which amplifier has failed. To establish that it is necessary arbitrarily to select one of the amplifiers and either turn off its power supply or disconnect it from service. If the selected amplifier is the unit which has not failed then the operation of the system will be interrupted.

It is therefore, an object of this invention to provide indicating apparatus for use with a system of amplifiers operating in parallel which, when one amplifier has failed unambiguously indicates the defective amplifier.

The indicating apparatus of this invention is intended to be used with the aforementioned type of prior art arrangement and consists of an additional coil, having a center-tap connected to the previously mentioned common connection, magnetically coupled to the coil in the aforementioned prior art arrangement. Indicating devices are connected between the ends of this additional coil and the center-tap of the first or prior art coil. The change in the distribution of voltages across the coils which occurs on the failure of one of the amplifiers selectively actuates one or other of the indicating devices.

Figure 1:
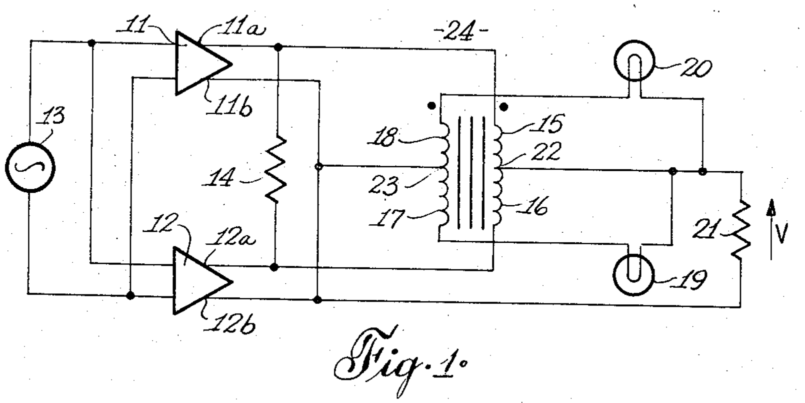
Figure 2:
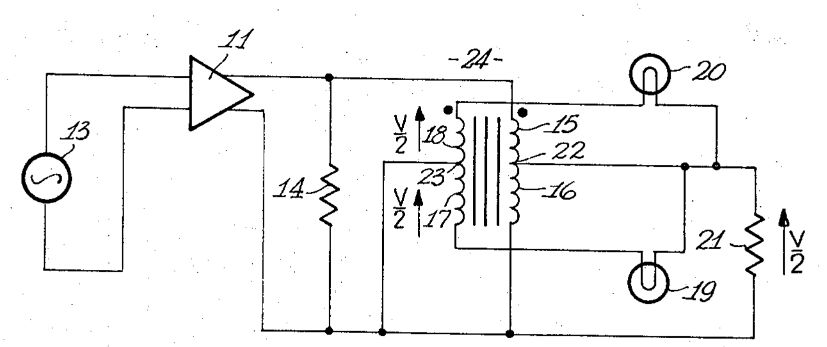
Figure 3:
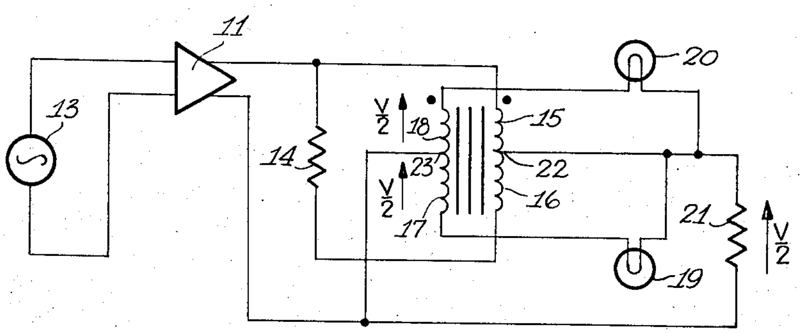

Further features and objects of this invention will become apparent from the following description taken in conjunction with the accompanying drawings in which:

FIGURE 1 is a schematic diagram, partly in block form, of an amplifier system using the indicating apparatus of this invention, FIGURE 2 is a schematic diagram illustrating the operation of the indicating system when one amplifier fails so that its output terminals become short circuited, and FIGURE 3 is a schematic diagram, similar to that of FIGURE 2, in which one amplifier has failed so that its output terminals are open circuited.

Referring now to FIGURE 1, a signal source 13 is shown connected in parallel to the input terminals of two power amplifiers 11 and 12. A coil with a center-tap 22 consists of two identical sections 15 and 16. The free end of coil section 15 is connected to one output terminal 11*a* of amplifier 11 and the free end of coil section 16 is connected to the equivalent output terminal 12*a* of amplifier 12. Center-tap 22 is connected through load 21 to the common connection of amplifier output terminals 11*b* and 12*b*. A resistor 14 is connected between the output terminals 11*a* and 12*a* of amplifiers 11 and 12.

Considering the operation of the system so far described, the voltage excursions at the output terminals 11*a* and 12*a* of amplifiers 11 and 12 are normally equal and hence no current flows in resistor 14. The currents flowing in coil sections 15 and 16 are equal and oppositely directed, thus there is no net magnetization of the magnetic core. The system operates as if each amplifier was directly connected to the load 21 which has a nominal value of half the required load impedance for a single amplifier, if the amplifiers are loaded to capacity when operating in parallel. The nominal value of resistor 14 is chosen to be four times the value of load 21. This choice of values ensures that, in the event of failure of one amplifier, the remaining amplifier still operates into the normal value of load impedance. The arrangement described so far and its operation are known in the prior art and further description is believed to be unnecessary.

To provide the indicating apparatus of this invention a further coil is provided consisting of two identical sections 17 and 18, each having the same number of turns as coil section 15, joined at a center-tap 23. The coil formed by sections 17 and 18 is magnetically coupled to the coil formed by sections 15 and 16. Center-tap 23 is connected to the common connection of amplifier output terminals 11*b* and 12*b*. Coil sections 15, 16, 17 and 18 together constitute a transformer 24. The relationship between the winding sense of the transformer coils is indicated in the drawings by solid dots, in the conventional manner. An indicating lamp 19 is connected between the free end of soil section 17 and center-tap 22, and an indicating lamp 20 is connected between the free end of coil section 18 and center-tap 22. Since coil sections 17 and 18 are used only to supply indicating lamps 19 and 20 they need be only low current windings of thin wire. Coil sections 17 and 18, having the same number of turns as coil sections 15 and 16, may advantageously be wound in a bifilar fashion therewith.

As has been noted above in normal operation with both amplifiers functioning there is no net magnetization of the core of transformer 24. Hence no voltage is induced in coil sections 17 and 18. Now, if the normal operating voltage across load 21 is considered to be V volts, each of the indicating lamps is connected between a source of voltage V and the common reference potential provided by amplifier output terminals 11*b* and 12*b*. Indicating lamps 19 and 20 are selected so that they are illuminated at this voltage. Thus in the normal operating condition of the amplifier system both lamps are illuminated. This provides a check that the indicating lamps themselves are functioning.

It will be apparent that either of the amplifiers may fail in such a manner that the output terminals of that amplifier are short-circuited or are open circuited. The indicating device should be responsive to either condition.

Considering the case where the amplifier 12 fails in such a manner that its output terminals become short circuited, the system may then be represented by the schematic diagram of FIGURE 2. In this arrangement it will be seen that coil sections 15 and 16 act as an auto-transformer with a step-down ratio of 2:1 coupling the output terminal of amplifier 11 to load 21. Thus at the amplifier side of the auto-transformer, load 21 appears as an impedance of four times its value. This is in fact equal to the resistance of resistor 14 and the output current from amplifier 11 is therefore shared equally between resistor 14 and load 21. Because load 21 is connected to the center-tap 22, there will be a voltage of $V/2$ volts appearing across load 21. Thus, the voltage now appearing across the load is one half the voltage which appeared when both amplifiers were operating normally.

The currents in coil sections 15 and 16 are now no longer equal and opposite as they were during normal operation. Consequently, there will be a magnetization of the core. Voltages having a magnitude $V/2$ volts are induced in each of coil sections 17 and 18. These voltages have instantaneous polarities with respect to the voltage across load 21 as indicated by the arrows in FIGURE 2. That is when the voltage across load 21 is positive with respect to the previously mentioned common connection point then the voltage at the free end of coil section 18 is positive with respect to the same common connection point and the voltage at the free end of coil section 17 is negative with respect to the common connection point. Accordingly the net voltage across indicating lamp 19 will be $V/2+V/2=V$ volts and the net voltage across indicating lamp 20 will be $V/2-V/2=$zero volts. This results in indicating lamp 19 being fully illuminated as before and indicating lamp 20 being extinguished. This indicates that a fault has occurred and that the fault is in amplifier 12.

The calculation of the next voltage appearing across the indicating lamps under fault conditions has implicity assumed that the voltage appearing across load 21 is in phase with the voltages appearing across coil sections 17 and 18. This condition, of course, occurs only when load 21 is purely resistive, however satisfactory operation of the indicating apparatus can be obtained when load 21 is substantially resistive.

Referring now to FIGURE 3, the situation there depicted is that of amplifier 12 having failed so that its output terminals have become open circuited. As before, considering coil sections 15 and 16 as forming an auto-transformer of step down ratio 2:1, resistor 14 has a reflected impedance at center-tap 22 of one quarter its value. This is in fact equal to the value of load 21 and results in a voltage $V/2$ volts appearing across load 21. Voltages of value $V/2$ are also induced in coil sections 17 and 18 having instantaneous polarities with respect to the voltage across load 21 as shown in FIGURE 3.

Accordingly the net voltage across indicating lamp 19 will be V volts and the net voltage across indicating lamp 20 will be zero volts. This results in indicating lamp 19 being full illuminated and indicating lamp 20 being extinguished. This indicates that a fault has occurred and that the fault is in amplifier 13.

If, instead of amplifier 12, amplifier 11 fails in such a manner that its output terminals become open circuited or isolated then the situation corresponds closely to that discussed above in regard to FIGURE 3 except that the polarity of the voltages across coil sections 17 and 18 is reversed with respect to the polarity of the voltage across substantially resistive load 21. This results in indicating lamp 20 being illuminated and indicating lamp 19 being extinguished, signifying that a fault has occurred and that the fault is in amplifier 11.

Since lamps 19 and 20 are illuminated in normal operation of the amplifying system a simple method is provided for setting amplifiers 11 and 12 to have equal gain by adjusting the amplifier gain controls until both lamps are illuminated with equal brilliance.

Thus there has been described indicating apparatus for use with a system of two paralleled amplifiers which, upon failure of one amplifier, gives an unambiguous indication as to the defective amplifier. While the embodiment described herein uses illuminating lamps it is to be understood that any suitable indicating device could be used in place of an illuminating lamp. While the embodiment of the invention herein described relates to amplifiers feeding a substantially resistive load it is to be understood that the invention extends to equivalent arrangements such as two transmitters feeding a common antenna.

I claim:

1. In an amplifier system having two amplifiers each with a pair of output terminals, a corresponding output terminal of each amplifier being connected to opposite ends of a first center-tapped coil, and a substantially resistive load connected between the center-tap of said first coil and a common connection to the other output terminal of each amplifier, indicating apparatus for indicating individual failure of one of the amplifiers comprising,
   a second coil, having a first and a second end and a center-tap, magnetically coupled to said first coil, said center-tap of said second coil being connected to said common connection,
   the number of turns of said second coil being substantially equal to the number of turns of said first coil,
   a first indicating device connected between said first end of said second coil and said center-tap of said first coil, and
   a second indicating device connected between said second end of said second coil and said center-tap of said first coil.

2. In an amplifier system having two amplifiers each with a pair of output terminals, a corresponding output terminal of each amplifier being connected to opposite ends of a first center-tapped coil, a substantially resistive load connected between the center-tap of said first coil and a common connection to the other output terminal of each amplifier and a resistor connected in shunt with said first coil, indicating apparatus comprising,
   a second coil, having a first and a second end and a center-tap magnetically coupled to said first coil, said center-tap of said second coil being connected to said common connection,
   the number of turns of said second coil being substantially equal to the number of turns of said first coil,
   a first indicating lamp connected between said first end of said second coil and said center-tap of said first coil, and
   a second indicating lamp connected between said second end of said second coil and said center-tap of said first coil.

3. An amplifying system comprising,
   a first and a second amplifier each having a pair of input signal terminals and a pair of output signal terminals,
   connector means coupling corresponding ones of said input terminals together for connection to a common signal source,
   a first coil having a first end, a second end and a center-tap,
   said first end of said first coil being connected to a first output signal terminal of said first amplifier,
   said second end of said first coil being connected to a corresponding first output signal terminal of said second amplifier,
   a substantially resistive load connected between said first coil center-tap and a common connection to the other output terminal of each amplifier,
   a second coil, having a first end, a second end and a center-tap, magnetically coupled to said first coil,
   the center-tap of said second coil being connected to said common connection,
   said second coil having substantially the same number of turns as said first coil,
   a first indicating device connected between said first end of said second coil and said center-tap of said first coil, and a second indicating device connected between said second end of said second coil and said center-tap of said first coil.

4. An amplifying system as defined in claim 3 wherein said first and second indicating devices are lamps.

5. An amplifying system as defined in claim 3 further comprising a resistor connected between said first output signal terminals of said first and second amplifiers having a value of four times the value of said substantially resistive load.

6. An amplifying system as defined in claim 5 wherein said first and second indicating devices are lamps.

7. In combination with a parallelly connected amplifier system comprising first and second similar amplifiers each having first and second output terminals, a first center-tapped coil wound on a magnetic core and having a first end connected to the first output terminal of said first amplifier and a second end connected to the first output terminal of said second amplifier, and a substantially resistive load connected between the center-tap of said first coil and a common connection to the second output terminal of each amplifier, an indicating apparatus comprising, a resistor connected between said first and second terminals having a value substantially four times the value of said substantially resistive load, a second center-tapped coil having the same number of turns as said first coil wound in a bifilar arrangement with said first coil on said magnetic core and having a first end and a second end, the center-tap of said second coil being connected to said common connection, a first indicating lamp connected between the first end of said second coil and the center-tap of said first coil and responsive to the combination of the voltage occurring between said first end and center-tap of said second coil and the voltage occurring across said resistive load to be illuminated when said amplifiers are operating normally and to be substantially extinguished when said first amplifier is defective, and a second indicating lamp connected between the second end of said second coil and the center-tap of said first coil and responsive to the combination of the voltage occurring between said second end and center-tap of said second coil and the voltage occurring across said resistive load to be illuminated when said amplifiers are operating normally and to be substantially extinguished when said second amplifier is defective.

8. An amplifying system as defined in claim 7 wherein said substantially resistive load is purely resistive.

References Cited

UNITED STATES PATENTS

| | | | |
|---|---|---|---|
| 1,663,086 | 3/1928 | Long | 340—253 |
| 2,824,296 | 2/1958 | Hecht et al. | 340—253 |
| 3,072,858 | 1/1963 | Siskind | 330—2 |

ROY LAKE, *Primary Examiner.*

NATHAN KAUFMAN, *Examiner.*